(12) United States Patent
Machani et al.

(10) Patent No.: US 11,151,232 B2
(45) Date of Patent: Oct. 19, 2021

(54) USER AUTHENTICATION BY ENDPOINT DEVICE USING LOCAL POLICY ENGINE AND ENDPOINT DATA

(71) Applicant: EMC IP Holding Company LLC, Hopkinton, MA (US)

(72) Inventors: Salah E. Machani, Medford, MA (US); Alex Zaslavsky, Brookline, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 299 days.

(21) Appl. No.: 16/258,991

(22) Filed: Jan. 28, 2019

(65) Prior Publication Data

US 2020/0242222 A1     Jul. 30, 2020

(51) Int. Cl.
| | |
|---|---|
| *G06F 21/31* | (2013.01) |
| *G06F 21/45* | (2013.01) |
| *H04L 29/06* | (2006.01) |
| *G06F 21/55* | (2013.01) |
| *G06F 21/33* | (2013.01) |

(52) U.S. Cl.
CPC .......... *G06F 21/316* (2013.01); *G06F 21/335* (2013.01); *G06F 21/45* (2013.01); *G06F 21/552* (2013.01); *H04L 63/102* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,162,649 B1 | 1/2007 | Ide et al. | |
| 10,325,259 B1 † | 6/2019 | Shahidzadeh | |
| 10,387,980 B1 † | 8/2019 | Shahidzadeh | |
| 2006/0224898 A1* | 10/2006 | Ahmed | G06F 21/316 713/186 |
| 2011/0016534 A1* | 1/2011 | Jakobsson | H04L 67/22 726/28 |
| 2016/0063235 A1* | 3/2016 | Tussy | G06K 9/22 726/6 |

OTHER PUBLICATIONS

Romain Robert et al., WiFi Roaming: Legal Implications and Security Contraints, International Journal of Law and Information Technology, Oxford University Press 2008.

* cited by examiner
† cited by third party

*Primary Examiner* — William J. Goodchild
(74) *Attorney, Agent, or Firm* — Ryan, Mason & Lewis, LLP (57) ABSTRACT

Techniques are provided for authenticating a user using an endpoint device of the user with a local policy and endpoint data. One method comprises obtaining, at an endpoint device of a given user, behavioral anomalies from a remote engine that generates the behavioral anomalies based on behavior of multiple users; in response to an access request by the given user, performing the following steps at the endpoint device: obtaining authentication data related to the given user and/or the endpoint device; generating features based on the authentication data; applying the features to a behavior model incorporating the behavioral anomalies to determine a behavior score for the access request; and evaluating the access request to make an authentication decision based on the behavior score. The behavior score indicates, for example, a confidence that the given user is an expected user and/or a same user who has previously been validated.

20 Claims, 9 Drawing Sheets

USER AUTHENTICATION BY ENDPOINT DEVICE USING LOCAL POLICY ENGINE AND ENDPOINT DATA

FIELD

The field relates generally to information processing systems, and more particularly to authentication techniques in such systems.

BACKGROUND

In modern organizations, there is an ongoing need to ensure that users accessing protected resources are properly authenticated (e.g., the users are who they say they are) and are authorized (e.g., a given user has the necessary permission(s) to access the requested resource). One challenge is finding the right balance between the applied security measures and the user convenience (e.g., without impairing the ability of the user to do his or her job). To increase the security and convenience (e.g., simultaneously), a number of organizations have implemented security methods that perform substantially continuous user authentication. These security methods enable an administrator to frequently assess an authentication status of each user and to eliminate the need for a single factor authentication or a multi-factor authentication when there have not been significant changes to the computing environment of the given user.

One problem with such continuous authentication solutions is that they typically rely on strict rules for accessing the user authentication status and they often ignore contextual data, risk factors, and behavioral patterns (thereby limiting the ability of Information Technology and/or security personnel to apply the necessary controls).

A need exists for improved techniques for authenticating a user.

SUMMARY

In one embodiment, a method comprises obtaining, at an endpoint device of a given user, one or more behavioral anomalies from a remote engine that generates the one or more behavioral anomalies based on behavior of a plurality of users; in response to an access request by the given user to access a protected resource, performing the following steps at the endpoint device of the given user: obtaining authentication data related to one or more of the given user and the endpoint device of the given user; generating one or more features based on the authentication data; applying the one or more features to at least one behavior model incorporating the one or more behavioral anomalies to determine a behavior score for the access request; and evaluating the access request to make an authentication decision based on the behavior score.

In some embodiments, the behavior score indicates a confidence that the given user is an expected user and/or a same user who has previously been validated. The behavior score evaluates, for example, (i) local behavior of one or more of the given user and the endpoint device of the given user; and (ii) behavior of a plurality of additional users. The behavior score required for the given user to access the protected resource is optionally configurable based on security requirements of the protected resource.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for authenticating a user using an endpoint device of the user, as well as a local policy and endpoint data.

In one or more embodiments, user authentication techniques are disclosed that make policy-based authentication decisions about a given user by an endpoint device of the given user by applying features derived from submitted authentication data to one or more behavior models to determine a behavior score for a given access request. The behavior score is evaluated to make the authentication decision. In some embodiments, the one or more behavior models comprise a global behavior model representing behavior of multiple users. The behavior score evaluates, for example, (i) local behavior of the given user and/or the endpoint device of the given user; and (ii) behavior of a plurality of additional users.

Figure 1:
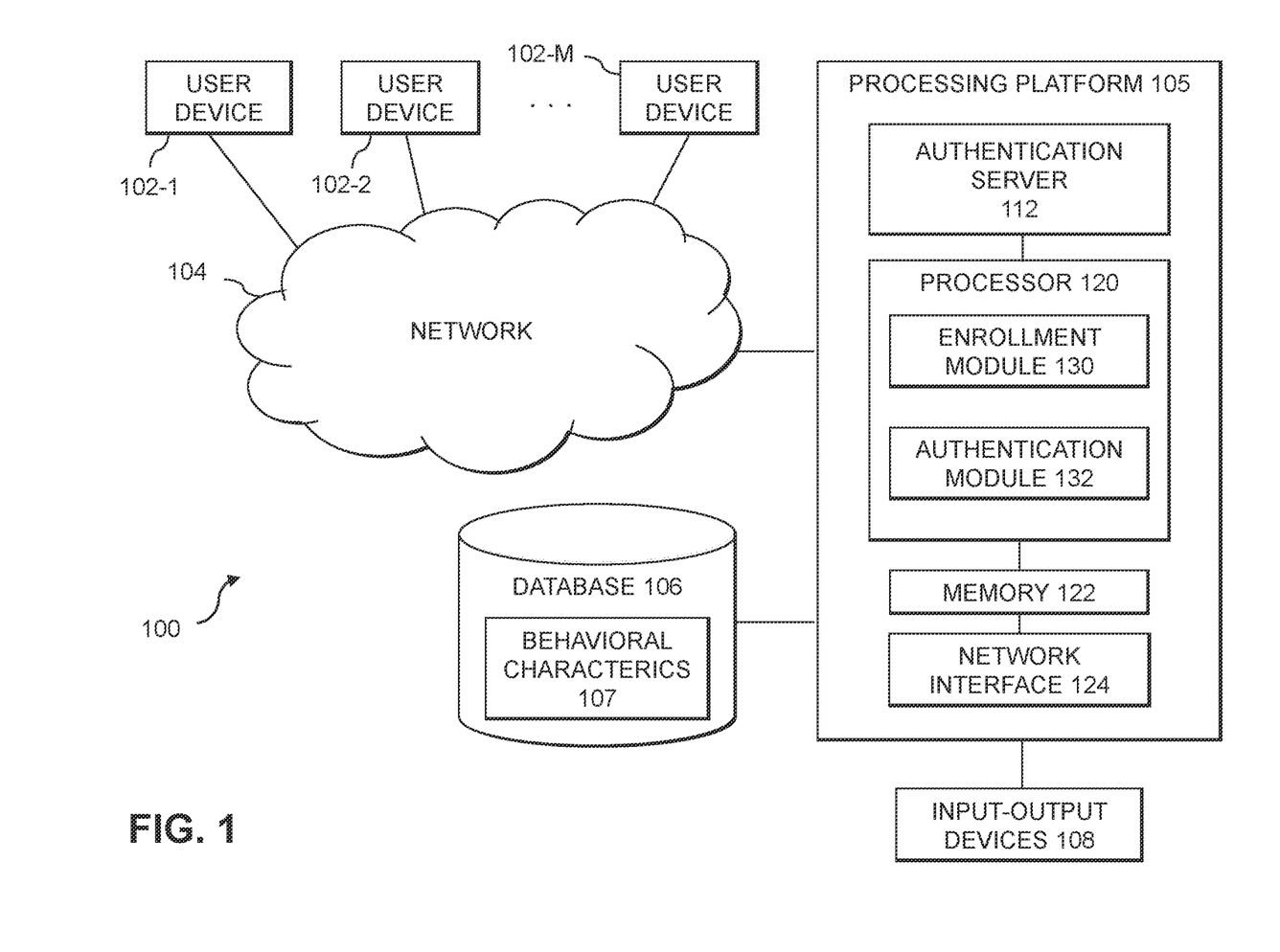
FIG. 1 shows an information processing system configured for performing user authentication in one embodiment of the disclosure.

FIG. 1 shows a computer network 100 configured in accordance with an illustrative embodiment of the disclosure. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store behavioral characteristics 107 of multiple users that can be incorporated into one or more behavior models (e.g., local behavior models) based on behavior of one or more users, as discussed further below.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
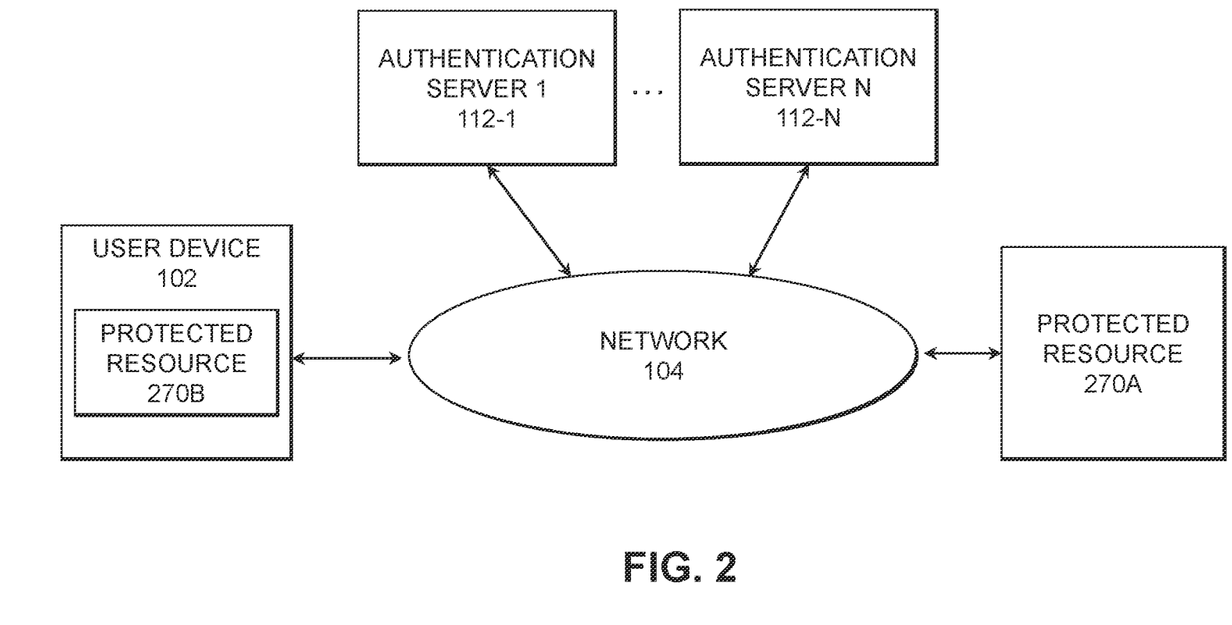
FIG. 2 shows another information processing system configured for performing user authentication in at least one embodiment of the disclosure.

In one or more embodiments of the disclosure (such as the example embodiment depicted in FIG. 1), the processing platform 105 comprises an authentication server 112. Authentication events, such as an evaluation of authentication information submitted by a user, initiated at respective ones of the user devices 102, are directed to the authentication server 112 over the network 104 for processing. The authentication server 112 can determine if a given access attempt is authentic, based on an evaluation of the responsive authentication information submitted by the user in response to a challenge. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the disclosure include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises an enrollment module 130 and an authentication module 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be distributed across multiple processing nodes, or separated across a larger number of modules within processor 120. As another example, multiple distinct processors can be used to implement different ones of the modules 130 and 132 or portions thereof.

At least portions of the enrollment module 130 and/or authentication module 132 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for user authentication of a user in authentication processes involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112, enrollment module 130 and/or authentication module 132 can be implemented elsewhere in the computer network 100.

An exemplary process utilizing enrollment module 130 of the processing platform 105 in computer network 100 will be described in more detail with reference to the flow diagram of FIG. 5. An exemplary process utilizing authentication module 132 of the processing platform 105 in computer network 100 will be described in more detail with reference to the flow diagram of FIG. 6.

FIG. 2 is a system diagram of an illustrative embodiment of the disclosure. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the disclosure can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the disclosure, the user of the user device 102 is authenticated by the endpoint user device 102 itself using a behavior score of the user determined by applying features extracted from submitted authentication data to one or more behavior models based on, at least in part, behavior of multiple users. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the disclosure.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, biometric sample, one-time password (OTP), or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, data store, web site or hardware device. In other words, a protected resource 270 is a resource that grants user access responsive to an authentication process, as will be described in greater detail below. For example, protected resource 270a may include an access-controlled file, an e-mail, a protected application, a remote application server such as a web site or other software program or hardware device that is accessed by the user device 102 over a network 104.

Additionally, in at least one embodiment of the disclosure, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access-controlled file, e-mail, protected application, remote application server such as a web site or other software program or hardware device that is accessed by the user device 102 over network 104. Similarly, it is possible that in order to unlock the mobile platform to perform operations, a successful authentication might be required.

Figure 3:
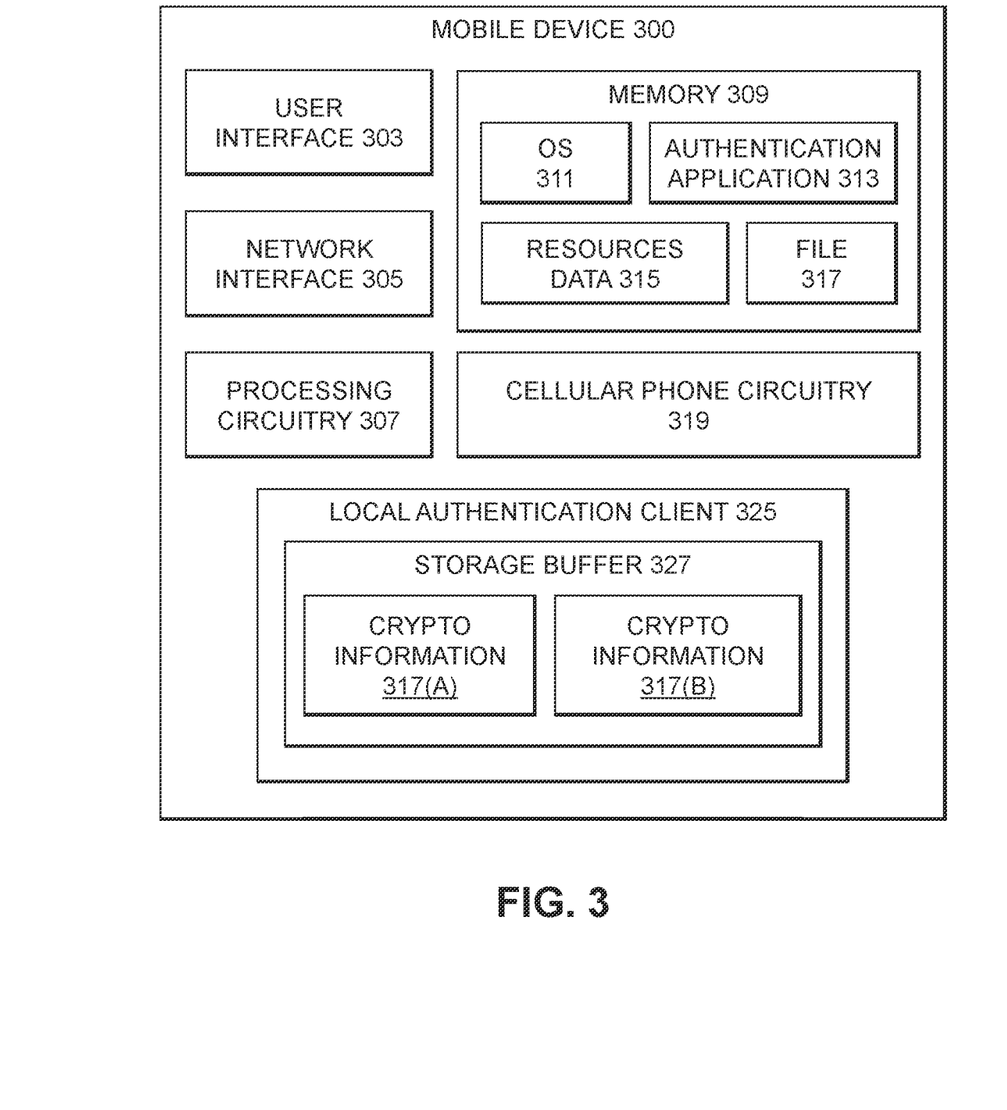
FIG. 3 is a system diagram of an exemplary mobile device on which at least one embodiment of the disclosure can be implemented.

FIG. 3 is a system diagram of an exemplary mobile device 300 on which at least one embodiment of the disclosure can be implemented. By way of illustration, as shown in FIG. 3, the exemplary mobile device 300 comprises a user interface 303 configured to receive user input and provide user output, such as a data file and/or data file location selection(s), such as described herein. One or more embodiments of the disclosure can include components such as a display screen, a capacitive touch display, and a push-button keyboard implemented for use in connection with the user interface 303.

Additionally, the mobile device 300 includes a network interface 305 configured to connect the mobile device 300 to a communications medium such as, for example, Wi-Fi and/or cellular telephony. Accordingly, the network interface 305 enables the mobile device 300 to communicate with the other components of an electronic environment.

The mobile device 300 further comprises a memory 309 configured to store one or more software constructs including, for example, an operating system 311, an authentication application 313, data for protected resources 315 (e.g., documents and restricted applications), a cryptographic information file 317, as well as other suitable or relevant material.

In one or more embodiments, processing circuitry 307 of the mobile device 300 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data requiring user authentication before permitting access. Further, when the processing circuitry 307 runs the authentication application 313, the processing circuitry 307 communicates with a local authentication client 325 in a secure manner, for example, to obtain cryptographic information 317(a), 317(b) from a storage buffer 327, as additionally described herein.

Additionally, for completeness, cellular phone circuitry 319 within mobile device 300 allows the user to establish cellular phone calls with other callers having remote devices, as would be appreciated by one skilled in the art.

It should be appreciated that the processing circuitry 307 can include one or more processors running specialized software components, such as detailed in connection with the techniques detailed herein and further depicted in FIG. 4.

In at least one embodiment of the disclosure, once the mobile device 300 is able to obtain valid cryptographic information, the user of the mobile device 300 is able to perform local user authentication to access protected resources. Accordingly, as noted, the mobile device 300 is provisioned with the authentication application 313 and cryptographic information file 317 holding cryptographic information to be used in connection with an authentication process. For example, and as further detailed herein, such cryptographic information within cryptographic information file 317 can include authentication data of the user in some embodiments.

Consequently, the processing circuitry 307 of the mobile device 300 can perform a local authentication operation using cryptographic information file 317 stored in the memory 309. In at least one embodiment of the disclosure the processing circuitry 307 runs the authentication application 313, which directs the user of the mobile device 300, via the user interface 303, to enter cryptographic information which is captured as one or more input elements 317(a), 317(b), etc. While the captured cryptographic information 317(a), 317(b), etc. is temporarily stored in the storage buffer 327 of the local authentication client 325, the authentication application 313 compares the captured user-provided cryptographic information 317(a), 317(b), etc. with, for example, authentication information of the user provided during enrollment in file 317 to determine a likelihood of a match and/or plausibility of the user-provided authentication information.

If a match or otherwise positive resolution is determined via this comparison, the authentication application 313 permits the user to access a protected resource (such as, for example, data in association with element 315 that are stored in the memory 309).

Figure 4:
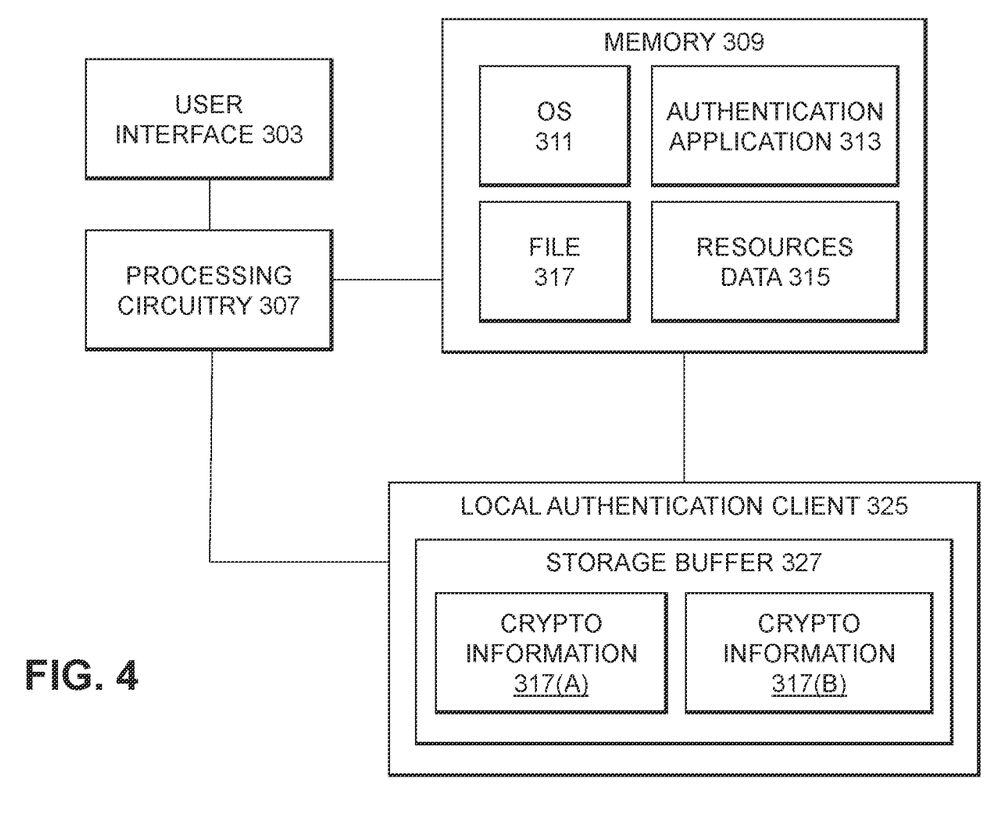
FIG. 4 is a system diagram of exemplary mobile device components, in accordance with one embodiment of the disclosure.

FIG. 4 is a system diagram of exemplary mobile device components, in accordance with at least one embodiment of the disclosure. As depicted in FIG. 4, a user can enter cryptographic information via user interface 303. This entered cryptographic information is captured as one or more input elements 317(a), 317(b). Such input elements can include, as noted above, the user-provided authentication data of the user.

Accordingly, the captured one or more input elements 317(a), 317(b), etc. can be stored in cryptographic information file 317 to be subsequently used in conjunction with fuzzy logic to carry out an authentication process.

Consequently, a corresponding cryptographic flow (carried out, for example, by authentication application 313 as run by operating system 311) can take the following exemplary form. The user is prompted (via user interface 303) as part of a challenge to enter cryptographic information in connection with an authentication request to access a protected resource associated with the mobile device (for example, the user wishes to access and/or unlock his or her smart phone). The entered cryptographic information is captured by the processing circuitry 307 as one or more input elements 317(a), 317(b) that are temporarily stored in the storage buffer 327 of the local authentication client 325.

Subsequently, the authentication application 313 compares the captured user-provided cryptographic information 317(a), 317(b), etc. with the original challenge in file 317 stored in memory 309 to determine a likelihood of a match and/or plausibility of the user-provided response(s). If the user-entered input elements 317(a), 317(b) are deemed to be matching and/or plausible, authentication is deemed successful and the user is granted access to the protected resource in question.

Figure 5:
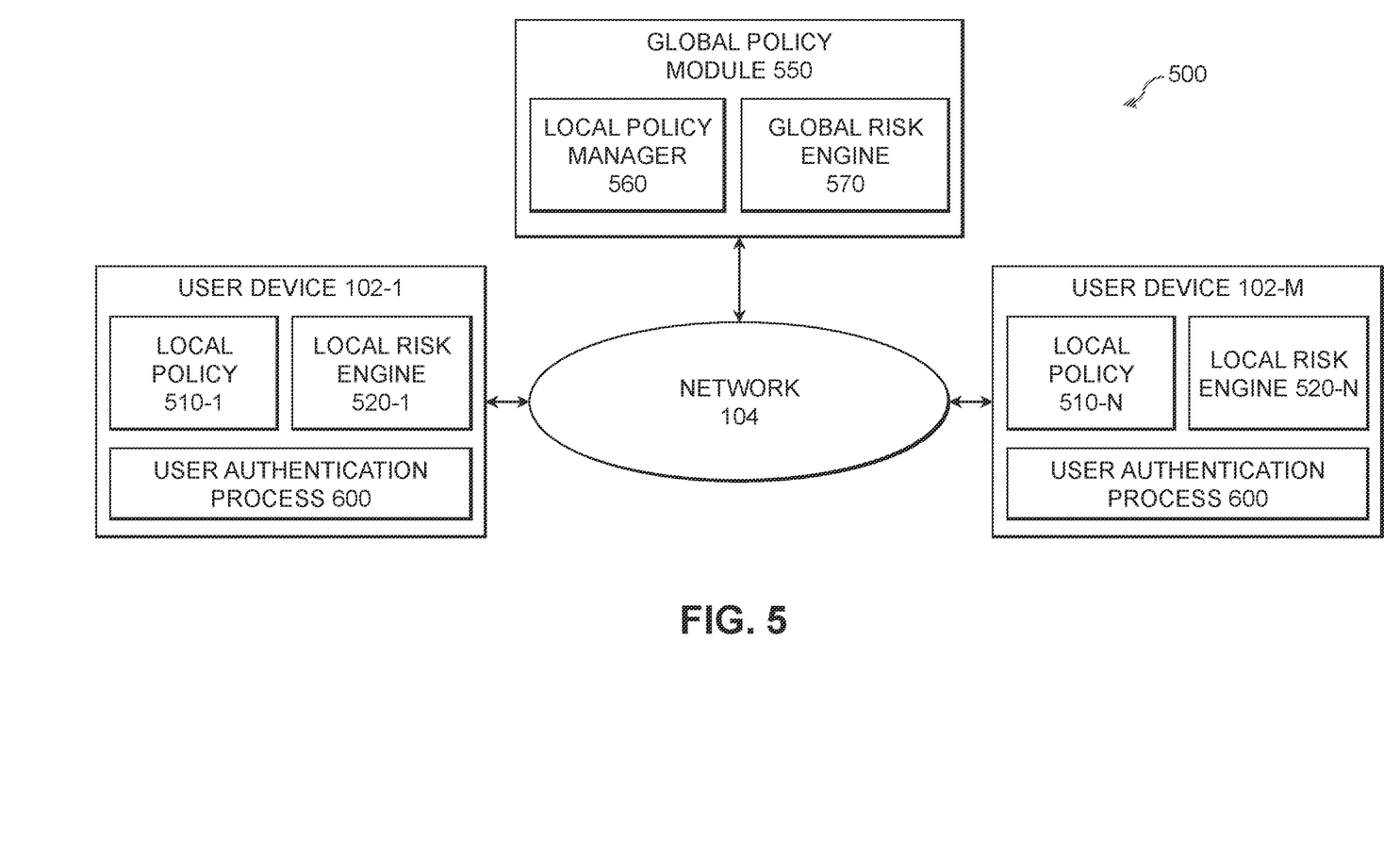
FIG. 5 illustrates an exemplary user authentication system that uses a local policy engine and local data to authenticate a user, according to one illustrative embodiment.

FIG. 5 illustrates an exemplary user authentication system 500 that uses a local policy engine and local data to authenticate a given user, according to one illustrative embodiment. As shown in FIG. 5, the exemplary user authentication system 500 comprises the plurality of user devices 102-1 through 102-M of FIG. 1, as well as a global policy module 550, coupled to a network 104, where the network 104 in this embodiment is assumed to represent a sub-network or other related portion of the larger computer network 100. The global policy module 550 may reside, for example, in the cloud, in some embodiments.

In the embodiment of FIG. 5, each of the plurality of user devices 102-1 through 102-M comprises a local policy 510-1 through 510-N, respectively, and a local risk engine 520-1 through 520-N, respectively. The local risk engines 520 are discussed further below in conjunction with FIG. 7. In addition, each of the plurality of user devices 102-1 through 102-M comprises an exemplary user authentication process 600, as discussed further below in conjunction with FIG. 6.

As shown in FIG. 5, the exemplary global policy module 550 comprises a local policy manager 560 and a global risk engine 570. In some embodiments, the global policy module 550 provides information technology and/or security administrators with tools to define authentication and authorization policies (e.g., local policies 510) based on, for example, corporate security practices, and to enforce the policies at the time of an access request for a protected resource. The policy takes as input a set of facts (often referred to as an identity assurance payload) and matches the identity assurance payload to the predefined configuration.

Generally, in some embodiments, the local risk engines 520 collect data points, analyze the information from the global risk engine 570, calculate features, compare the features to past behaviors, check against known malicious behaviors (e.g., rules), aggregate the information and respond with a risk score (e.g., an identity assurance), and optionally, score reasons and possible further recommendations.

In one or more embodiments, the global risk engine 570 analyzes fewer patterns than the local risk engine 520, for some behaviors, it may not make sense to compare the behavior of multiple users on an organizational/peer group level. For example, consider a location of a user, and an exemplary user is accessing a protected resource from Ireland, which the local risk engine 520 identified as an anomaly for the user since the user was never previously seen from this location. The score decreased as a result of the anomaly identification. The global risk engine 570, however, might find that Ireland is not a new location on the organization level (e.g., other users have accessed the protected resource from Ireland, for example, if the organization has an office in Ireland) and 80% of user peers accessed the protected resource from Ireland. The score is updated, and the assurance is increased.

The global policy module 550 optionally provides a tool that enables administrators to configure local policies 510 in the cloud, for example, and push the configurations to the user devices 102 (e.g., endpoints).

In some embodiments, the user authentication system 500 (and, generally, the disclosed authentication system as a whole) is an open architecture so that new data feeds and facts can be introduced. In some implementations, the following exemplary attributes are processed:

a network to which a given device is connected;
external environments, including other devices in proximity;
device location information;
registered mobile device used for performing multi-factor authentication (MFA) in proximity to the given device;
user movements (e.g., walking up or walking away from the given device);
behavioral biometric data collected from an authenticator (e.g., gait information and/or touch screen gestures);
endpoint keystroke patterns;
last successful manual primary authentication and/or MFA on a given device;
endpoint characteristics (e.g., manufacturer, operating system, and anti-virus status); and
cross organization behavior, common patterns and anomalous patterns.

Consider the following exemplary identity assurance payload:

username: Alice; lastSuccessfullMFA: 1541668961; deviceType: CorpLaptop; deviceManufacturer: Dell; network: officeWifi; behaviorScore (0-1):0.2

Given such payload, an authentication system can match a predefined configuration and make an authentication decision as to whether the authentication system trusts the user identity or whether a given user has to re-authenticate.

Contextual data and user behaviors are assessed by the local risk engines 520, relative to behavior models based on the local policies 510 and behavioral anomalies of multiple users, before and after user authentication and a behavior score is provided, when needed to make authorization decisions. In some embodiments, the contextual data and user behaviors are compared by the local risk engines 520 to one or more stored historical behavioral baselines. The behavior score (e.g., a risk score) is based on the result of this comparison, and is applied to the local policy 510, where the access decision is made. The behavior score represents the confidence level that the exemplary user authentication system 500 has that the user interacting with the system is the expected user to use the system or the same user whose credentials were previously validated, e.g., at the beginning of a the session.

In one or more embodiments, the local risk engines 520 prepare an identity assurance payload, described above, to evaluate the local policy 510. At this stage, the behavior model will make the necessary feature calculations based on features extracted from the authentication data associated with an access request. The feature calculations can be defined by a computer security expert. In some embodiments, the configuration is optionally exposed to an organization customer, so that the customer can create and/or modify their own features.

In addition, in some embodiments of the disclosure, the local risk engines 520 calculate the behavior score for a given access request based on local behavior (e.g., using some of the indicators described above) and organization-wide risk patterns. Feature weights are optionally used as part of an anomaly detection machine learning method.

In at least one embodiment, the local behavior models are learned using only data of a given user. The local behavior model uses data and features calculated on local events and also events that occurred online/remotely (these events may be sent to the local risk engine 520 with some delay, e.g., depending on user connectivity status). For example, local events may comprise, a login to the user device 102, Bluetooth connected devices analysis, and mobile proximity status. In addition, remote events may comprise, for example, a cloud application login, and an MFA authentication result.

In some embodiments, the global behavior model is learned, for example, on a population of an organization, or a portion thereof (an organization definition is optionally thus configurable and can represent a whole organization or an organization subset, such as evaluated user peers). The goal of the global behavior model is to access the behavior of the local and remote features of multiple users.

In order to get a final behavior score, the following exemplary equation can be used:

$$Score = Score_{user} * \alpha + Score_{org} * (1 - \alpha)/2$$

$$\alpha = \left\{ N_{User} - 80: \frac{N_{User}}{100}; 80 - inf: 0.2 \right\}$$

where $N_{User}$ is a number of successful user authentications, and $\alpha$ controls a weight of the organization weight in the final score. $\alpha$ will represent a measure of user traffic so when there is enough user history then the score will be based more on user behavior than on global behavior. When the user is a new or rarely active user, however, then risk is assessed based on the global policy model 560.

In some embodiments, the configuration (e.g., the criteria for global policy 550 and local policies 510) is created by an administrator, for example, in a cloud portal, and published/pushed to the user devices 102 once a given user device 102 is securely connected to the portal.

In one or more embodiments, the local policies 510 and/or the local risk engines 520 are implemented based on, for example, the policies, risk engines and risk-based analytics of the RSA SecureID® Access, commercially available from RSA, The Security Division of Dell EMC, of Hopkinton, Mass., as extended herein to provide for authentication by an endpoint device of the user.

Figure 6:
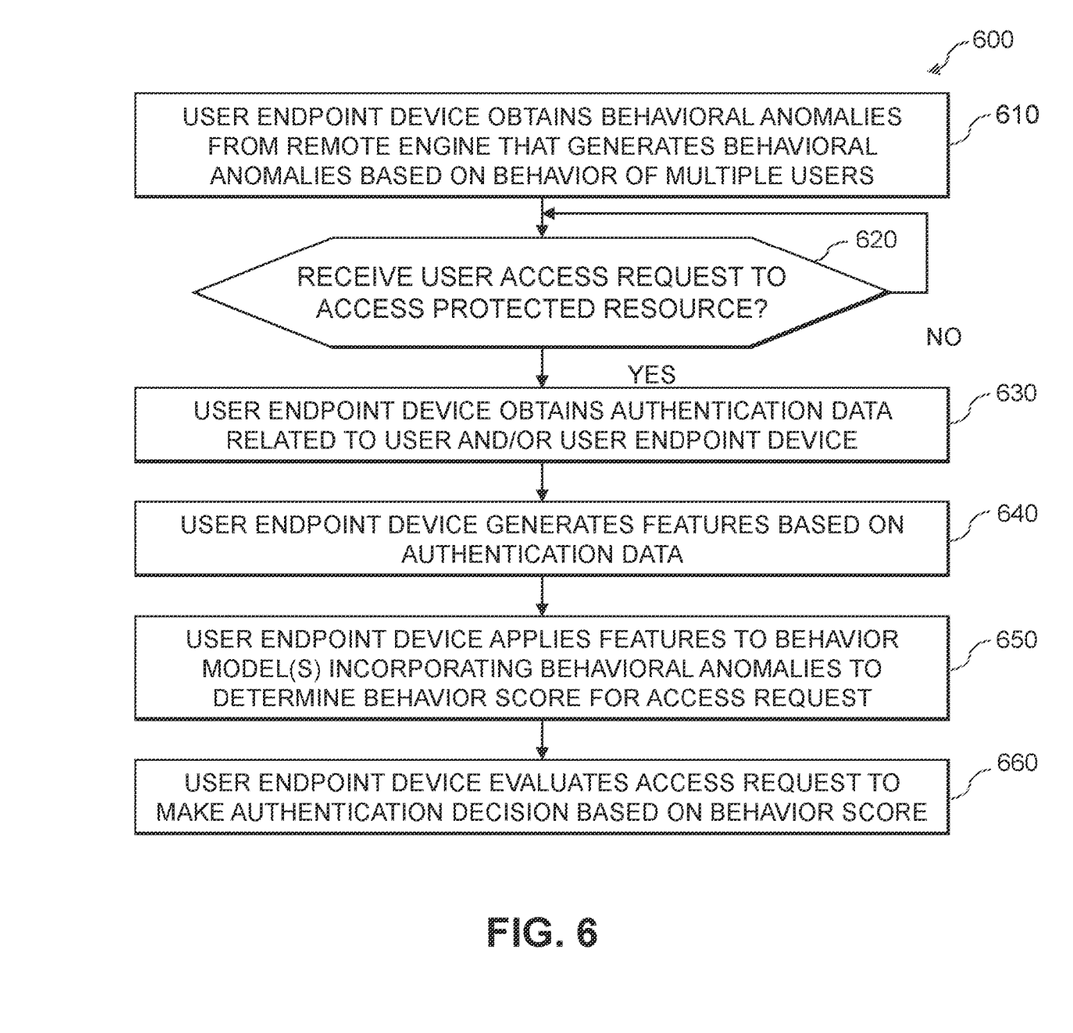
FIG. 6 is a flow diagram of an exemplary user authentication process using a local policy engine and local data to authenticate a user, according to at least one embodiment.

FIG. 6 is a flow diagram of an exemplary user authentication process 600 using a local policy engine and local data, according to one illustrative embodiment. As shown in FIG. 6, during step 610, the exemplary user authentication process 600 obtains, at an endpoint device of a given user, one or more behavior anomalies from a remote engine that generates the behavior anomalies based on behavior of multiple users.

During step 620, the exemplary user authentication process 600 performs a test to determine if an access request by the given user to access a protected resource is received.

In response to an access request by the given user to access a protected resource, the exemplary user authentication process 600 obtains authentication data related to the given user and/or the endpoint device of the given user during step 630.

Thereafter, the exemplary user authentication process 600 generates features based on the authentication data during step 640.

The features are applied to one or more behavior model(s) incorporating the behavioral anomalies during step 650 to determine a behavior score for the access request. Finally, the access request is evaluated during step 660 to make an authentication decision based on the behavior score.

In some embodiments, if the behavior score determined during step 650 is below a specified critical threshold, the user authentication system 500 can optionally continuously analyze the behavior score (e.g., recalculate the behavior score based on an updated model after a predefined waiting time period). If the given user fails authentication, based on the behavior score below the specified critical threshold, the given user will be locked out and asked to re-authenticate.

The particular processing operations and other network functionality described in conjunction with the flow diagram of FIG. 6 is presented by way of illustrative example only, and should not be construed as limiting the scope of the disclosure in any way. Alternative embodiments can use other types of processing operations to apply features extracted from authentication data for determining a behavior score at an endpoint device and to evaluate access requests based on the behavior score. For example, the ordering of the process steps may be varied in other embodiments, or certain steps may be performed concurrently with one another rather than serially.

Figure 7:
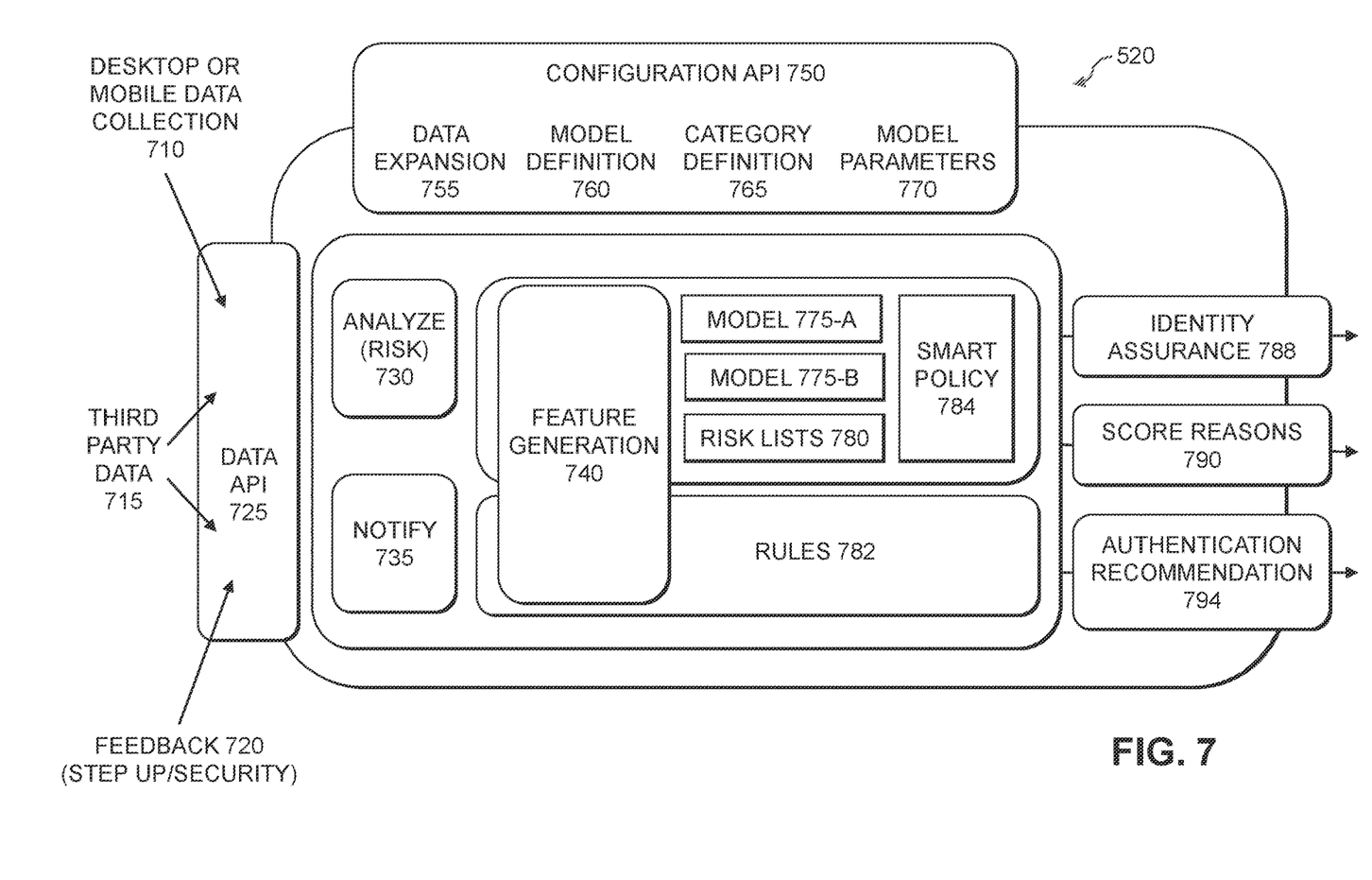
FIG. 7 illustrates the local risk engine of FIG. 5 in further detail, according to some embodiments.

FIG. 7 illustrates the local risk engine 520 of FIG. 5 in further detail, according to some embodiments. In some embodiments, the local risk engine 520 is implemented in a similar manner as existing global risk engines 550. A shown in FIG. 7, the exemplary local risk engine 520 comprises a data application programming interface (API) 725 that receives desktop or mobile data collection 710, third party data 715 (for example, using generic fields) and feedback data 720 (e.g., step up security feedback). The received data is applied by the data API 725, for example, in parallel, to an analyze function 730 that analyzes risk and a notify function 735 that updates one or more user profiles and/or user lists.

As shown in FIG. 7 a feature generation module 740 derives features from the received data and applies the derived features to one or more models 775-A and 775-B, one or more risk lists 780 and one or more rules 782. The outputs of the models 775-A and 775-B and risk lists 780 are processed by a smart policy 784 based on, for example, one or more decision trees.

Based on the processing of the rules 782 and the smart policy 784, the local risk engine 520 generates an identity assurance score 788, score reasons 790, and/or one or more authentication recommendations 794 (e.g., for step-up authentication), as part of an authentication result. Consider a user trying to access a protected resource having a need for a high identity assurance. The user logs in, but the system determines that the current assurance level is only medium. The system can suggest other actions that the user must perform to gain a higher level of assurance (e.g., scanning a fingerprint).

In addition, the exemplary local risk engine 520 comprises a configuration API 750 that allows an administrator or other user to specify a data expansion 755 (e.g., to expand a content of an identity assurance payload), a model definition 760, a category definition 765, and/or model parameters 770.

Among other benefits, the disclosed techniques for authenticating a user by an endpoint device, using a local policy and endpoint data, allow fine-grained authentication and an authorization policy on an endpoint device, whether or not the endpoint device is connected to a corporate network or the Internet, for example. In addition, some embodiments perform substantially continuous local (to the device) authentication based on a risk assessment. In some embodiments, the global polices (e.g., risk models and behavior patterns) are shared among multiple organizations, for example, through a cloud risk engine.

One or more embodiments of the disclosure provide improved methods, apparatus and computer program products for authenticating a user by an endpoint device, using a local policy and endpoint data. The foregoing applications and associated embodiments should be considered as illustrative only, and numerous other embodiments can be configured using the techniques disclosed herein, in a wide variety of different applications.

It should also be understood that the disclosed user authentication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed policy-based techniques for authenticating a user by an endpoint device of the user may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based user authentication engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based user authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
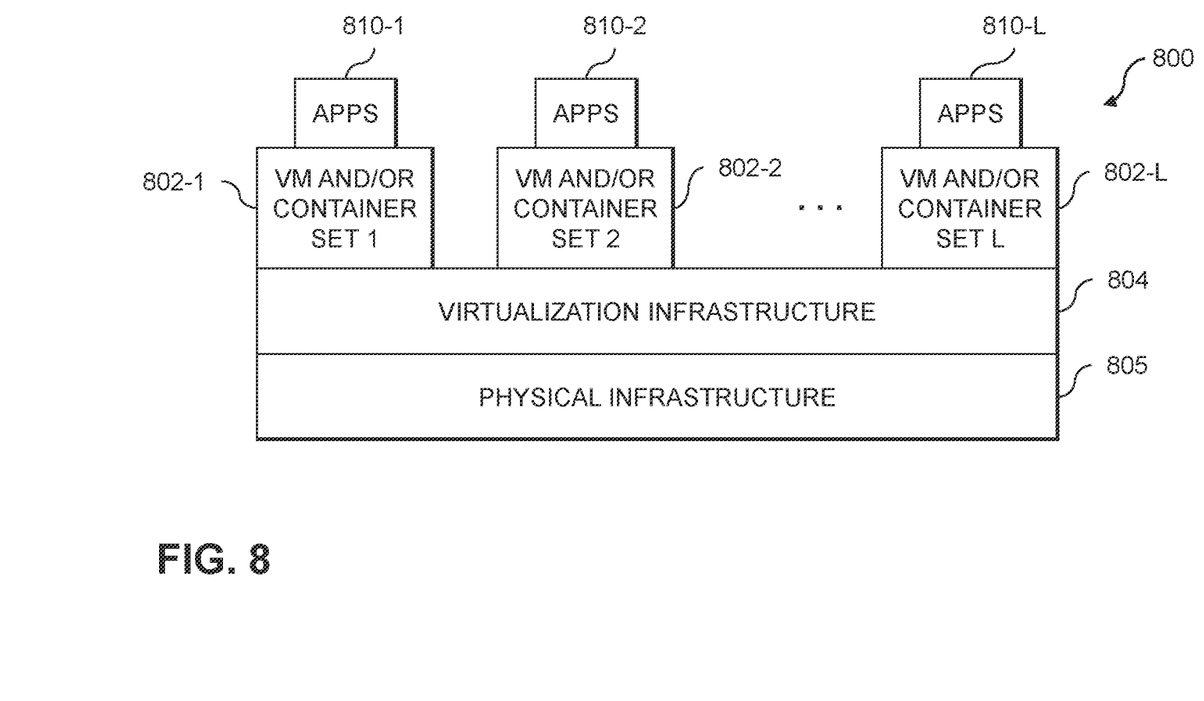
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the disclosed user authentication system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide user authentication functionality of the type described above for one or more processes running on a given one of the VMs. For example, each of the VMs can implement user authentication control logic and associated endpoint policy evaluation techniques for providing user authentication functionality at the endpoint for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide user authentication functionality of the type described above for one or more processes running on different ones of the containers. For example, a container host device supporting multiple containers of one or more container sets can implement one or more instances of user authentication control logic and associated endpoint policy evaluation features for use in evaluating authentication information submitted by a user.

As is apparent from the above, one or more of the processing modules or other components of the authentication server 112 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
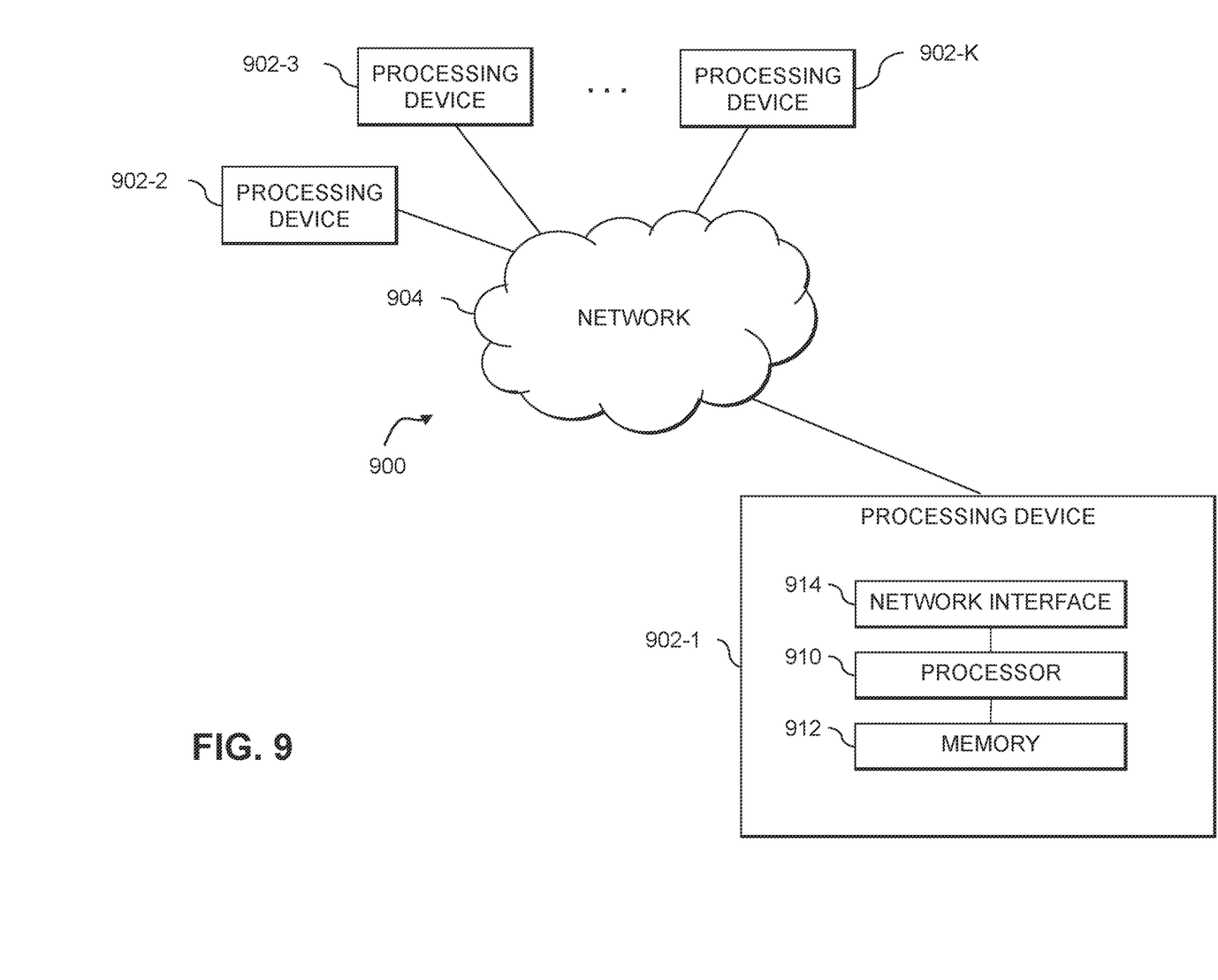
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, at an endpoint device of a given user, one or more behavioral anomalies from a remote engine that generates the one or more behavioral anomalies based on behavior of a plurality of users;
in response to an access request by the given user to access a protected resource, performing the following steps at the endpoint device of the given user:
obtaining authentication data related to one or more of the given user and the endpoint device of the given user;
generating one or more features based on the authentication data;
applying, using at least one processing device of the endpoint device of the given user, the one or more features to at least one behavior model incorporating the one or more behavioral anomalies to determine a behavior score for the access request; and
evaluating, using the at least one processing device, the access request to make an authentication decision based on the behavior score.

2. The method of claim 1, wherein the at least one behavior model comprises one or more configurable rules.

3. The method of claim 1, wherein the behavior score indicates a confidence that the given user is one or more of an expected user and a same user who has previously been validated.

4. The method of claim 1, wherein a content of the authentication data is configurable by an administrative user.

5. The method of claim 1, wherein the behavior score evaluates (i) local behavior of one or more of the given user and the endpoint device of the given user; and (ii) behavior of a plurality of additional users.

6. The method of claim 1, further comprising the step of determining if the given user is authorized to access the protected resource.

7. The method of claim 1, further comprising the step of repeating one or more of the obtaining the authentication data, generating, applying and evaluating steps during a given session to re-authenticate the user.

8. The method of claim 7, wherein the repeating step is performed if the behavior score is below a predefined threshold.

9. The method of claim 1, further comprising the step of determining if additional authentication of the given user should be performed.

10. The method of claim 1, wherein the behavior score required for the given user to access the protected resource is configurable based on security requirements of the protected resource.

11. The method of claim 1, wherein the behavior score is weighted, based on an amount of traffic associated with one or more of the given user and the endpoint device of the given user, between (i) a local behavior score determined from local behavior of one or more of the given user and the endpoint device of the given user, and (ii) a global behavior score determined from the behavior of the plurality of users.

12. A system, comprising:
a memory; and
at least one processing device, coupled to the memory, operative to implement the following steps:
obtaining, at an endpoint device of a given user; one or more behavioral anomalies from a remote engine that generates the one or more behavioral anomalies based on behavior of a plurality of users;
in response to an access request by the given user to access a protected resource, performing the following steps at the endpoint device of the given user:
obtaining authentication data related to one or more of the given user and the endpoint device of the given user;
generating one or more features based on the authentication data;

applying the one or more features to at least one behavior model incorporating the one or more behavioral anomalies to determine a behavior score for the access request; and evaluating the access request to make an authentication decision based on the behavior score.

13. The system of claim 12, wherein the behavior score indicates a confidence that the given user is one or more of an expected user and a same user who has previously been validated.

14. The system of claim 12, wherein the behavior score evaluates (i) local behavior of one or more of the given user and the endpoint device of the given user; and (ii) behavior of a plurality of additional users.

15. The system of claim 12, further comprising the step of repeating one or more of the obtaining the authentication data, generating, applying and evaluating steps during a given session to re-authenticate the user.

16. The system of claim 12, wherein the behavior score required for the given user to access the protected resource is configurable based on security requirements of the protected resource.

17. A computer program product; comprising a non-transitory machine-readable storage medium having encoded therein executable code of one or more software programs, wherein the one or more software programs when executed by at least one processing device perform the following steps:

obtaining, at an endpoint device of a given user, one or more behavioral anomalies from a remote engine that generates the one or more behavioral anomalies based on behavior of a plurality of users;

in response to an access request by the given user to access a protected resource, performing the following steps at the endpoint device of the given user:

obtaining authentication data related to one or more of the given user and the endpoint device of the given user;

generating one or more features based on the authentication data;

applying the one or more features to at least one behavior model incorporating the one or more behavioral anomalies to determine a behavior score for the access request; and evaluating the access request to make an authentication decision based on the behavior score.

18. The computer program product of claim 17, wherein at least one of:

the behavior score indicates a confidence that the given user is one or more of an expected user and a same user who has previously been validated; and the behavior score evaluates (i) local behavior of one or more of the given user and the endpoint device of the riven user; and (ii) behavior of a plurality of additional users.

19. The computer program product of claim 17, further comprising the step of repeating one or more of the obtaining the authentication data, generating, applying and evaluating steps during a given session to re-authenticate the user.

20. The computer program product of claim 17, wherein the behavior score required for the given user to access the protected resource is configurable based on security requirements of the protected resource.

* * * * *

UNITED STATES PATENT AND TRADEMARK OFFICE
CERTIFICATE OF CORRECTION

PATENT NO. : 11,151,232 B2
APPLICATION NO. : 16/258991
DATED : October 19, 2021
INVENTOR(S) : Salah E. Machani et al.

It is certified that error appears in the above-identified patent and that said Letters Patent is hereby corrected as shown below:

In the Claims

Column 16, Line 57, the portion of Claim 12 reading "a given user; one or" should read -- a given user, one or --

Column 18, Line 21, the portion of Claim 18 reading "riven user;" should read -- given user; --

Signed and Sealed this
Seventh Day of December, 2021

Drew Hirshfeld
*Performing the Functions and Duties of the
Under Secretary of Commerce for Intellectual Property and
Director of the United States Patent and Trademark Office*